(12) United States Patent
Riley et al.

(10) Patent No.: US 10,946,973 B2
(45) Date of Patent: Mar. 16, 2021

(54) SYSTEM AND METHOD FOR PROVIDING END-USE SPECIFIC CUSTOMIZATION OF GAS TURBINE ENGINE OPERATION

(71) Applicant: HONEYWELL INTERNATIONAL INC., Morris Plains, NJ (US)

(72) Inventors: Harold Riley, Gilbert, AZ (US); Paul Topper, Tempe, AZ (US); Brian Petterson, Chandler, AZ (US); Timothy Ray O'Brien, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 123 days.

(21) Appl. No.: 16/357,020

(22) Filed: Mar. 18, 2019

(65) Prior Publication Data

US 2020/0002019 A1 Jan. 2, 2020

Related U.S. Application Data (60) Provisional application No. 62/690,406, filed on Jun. 27, 2018.

(51) Int. Cl.
*B64D 31/12* (2006.01)
*F01D 19/00* (2006.01)
(Continued)

(52) U.S. Cl.
CPC ............ *B64D 31/12* (2013.01); *F01D 19/00* (2013.01); *F02C 7/268* (2013.01);
(Continued)

(58) Field of Classification Search
CPC . A23G 9/28; A23G 9/045; A23G 9/08; A23G 9/12; A23G 9/283; A23G 9/30;
(Continued)

(56) References Cited

U.S. PATENT DOCUMENTS 6,487,096 B1 11/2002 Gilbreth et al.
7,143,003 B2 11/2006 Certain
(Continued)

FOREIGN PATENT DOCUMENTS

WO 2010057312 A1 5/2010

OTHER PUBLICATIONS

Soares, C.M.; Gas Turbines in Simple Cycle Mode; Gas Turbines in Simple Cycle & Combined Cycle Applications, 1998.

*Primary Examiner* — Anthony Ayala Delgado
(74) *Attorney, Agent, or Firm* — Lorenz & Kopf, LLP (57) ABSTRACT

A system and method provide aircraft-specific customization of gas turbine engine operation. The system includes a gas turbine engine, a first processing unit, and an engine controller. The first processing unit is configured to selectively transmit an activation key. The engine controller is in operable communication with the first processing unit and the gas turbine engine. The engine controller is configured to receive the activation key transmitted by the first processing unit and is operable, upon receipt of the activation key, to: verify the received activation key is correct, enable operational parameters in the gas turbine engine and the engine controller when the received activation key is correct, and control the gas turbine engine using the enabled operational parameters.

18 Claims, 2 Drawing Sheets

(51) Int. Cl.
*F02C 7/268* (2006.01)
*F02D 41/14* (2006.01)
*G06F 12/08* (2016.01)
*H04L 29/06* (2006.01)

(52) U.S. Cl.
CPC ......... *F02D 41/1406* (2013.01); *G06F 12/08* (2013.01); *H04L 63/064* (2013.01)

(58) Field of Classification Search
CPC .......... A23G 9/48; A23G 9/281; A23G 9/282; A23G 9/22; A23G 9/503; A23G 9/06; A23G 9/224; A23G 9/288; A23G 9/225; A23G 9/40; A23G 9/52; A23G 9/20; A23G 9/228; A23G 9/285; A23G 9/32; A23G 9/34; A23G 9/44; A23G 9/10; A23G 9/363; A23G 2200/06; A23G 9/166; A23G 9/221; A23G 9/222; A23G 9/227; A23G 9/24; A23G 9/287; A23G 3/20; A23G 9/083; A23G 9/16; A23G 9/163; A23G 9/26; A23G 9/327; A23G 9/46; A23G 7/02; A23G 9/00; A23G 9/106; A23G 9/14; A23G 9/245; A23G 1/0086; A23G 1/226; A23G 1/505; A23G 2220/02; A23G 3/0034; A23G 3/0042; A23G 3/0273; A23G 3/0294; A23G 3/125; A23G 3/343; A23G 3/563; A23G 7/00; A23G 9/04; A23G 9/42; A23G 9/506; A23G 1/04; A23G 1/18; A23G 1/20; A23G 1/30; A23G 2200/00; A23G 2200/12; A23G 3/02; A23G 3/0252; A23G 3/10; A23G 3/50; A23G 3/54; A23G 3/566; A23G 9/286; A23G 9/322; A23G 9/38; B64D 31/12; F01D 19/00; F02C 7/268; F02D 41/1406; G06F 12/08; G06F 21/10; G06F 21/629; H04L 63/064
See application file for complete search history.

(56) References Cited

U.S. PATENT DOCUMENTS

| | | | |
|---|---|---|---|
| 8,417,433 | B2 | 4/2013 | Gauthier et al. |
| 9,014,945 | B2 | 4/2015 | Abrol et al. |
| 9,096,325 | B2 | 8/2015 | Oltheten et al. |
| 9,342,060 | B2 | 5/2016 | Fuller et al. |
| 9,382,849 | B2 | 7/2016 | Duke et al. |
| 9,429,078 | B1 | 8/2016 | Crowe et al. |
| 9,605,559 | B2 | 3/2017 | Truesdale et al. |
| 9,759,132 | B2 | 9/2017 | Khalid |
| 9,909,510 | B2 | 3/2018 | Poth, Jr. |
| 10,040,565 | B2 | 8/2018 | Looper et al. |
| 10,187,371 | B1 * | 1/2019 | Casillas ................ H04L 63/083 |
| 2007/0136817 | A1 | 6/2007 | Nguyen |
| 2008/0313472 | A1 | 12/2008 | Modesitt |
| 2011/0258633 | A1 | 10/2011 | Matsumura |
| 2014/0271117 | A1 | 9/2014 | Armstrong et al. |
| 2018/0007547 | A1 | 1/2018 | Scholten et al. |
| 2018/0164796 | A1 | 6/2018 | Garciamoreno et al. |
| 2018/0297718 | A1 | 10/2018 | Adibhatla |
| 2018/0319510 | A1 | 11/2018 | Danielson et al. |
| 2019/0230083 | A1 * | 7/2019 | Chen ................ G06F 16/24553 |

* cited by examiner

SYSTEM AND METHOD FOR PROVIDING END-USE SPECIFIC CUSTOMIZATION OF GAS TURBINE ENGINE OPERATION

CROSS-REFERENCE TO RELATED APPLICATION

This application claims the benefit of U.S. Provisional Application No. 62/690,406, filed Jun. 27, 2018.

TECHNICAL FIELD

The present invention generally relates to gas turbine engine operation, and more particularly relates to a system and method for providing end-use specific customization of gas turbine engine operation.

BACKGROUND

Gas turbine engines are used in myriad environments and for various purposes. One environment where gas turbine engines is relatively ubiquitous is on an aircraft. The gas turbine engines on aircraft are used to generate and deliver various types of power. This power can be in the form of, but not limited to, pneumatic power, hydraulic power, rotational mechanical power, electric power, and propulsion thrust.

The gas turbine engines on an aircraft (and in various other environments) are typically controlled via an engine controller. In general, the function of the engine controller is to govern the time, amount, and type of energy provided to the aircraft, while maintaining the gas turbine operating parameters within appropriate limits (e.g., maximum turbine temperature and maximum rotor speed).

Most gas turbine engines are designed with significant amounts of operational margin, which means that the engines are, at times, operated at power levels beyond what is needed. As is generally known, the operational life of a gas turbine (time between overhaul) and the total fuel consumption are proportional to the percentage of time that the engine is operated at high levels of output. As such, many gas turbine engine end-users, such as aircraft owners/operators, would find it advantageous to be able to customize gas turbine engine operation to meet operational goals, while simultaneously extending gas turbine engine life.

Unfortunately, existing gas turbine engine systems (i.e., the gas turbine engine and associated engine controller) do not provide the ability for end-users to selectively customize the functionality of the gas turbine engine based on current needs. Thus, overall gas turbine engine system design may not be optimal, especially for end-users with relatively large numbers of gas turbine engines, such as an owner/operator with a relatively large fleet of aircraft.

Hence, there is a need for a system and method that provides aircraft-specific customization of gas turbine engine operation. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for providing end-use specific customization of gas turbine engine operation includes a gas turbine engine, a first processing unit, and an engine controller. The first processing unit is configured to selectively transmit an activation key. The engine controller is in operable communication with the first processing unit and the gas turbine engine. The engine controller is configured to receive the activation key transmitted by the first processing unit and is operable, upon receipt of the activation key, to: verify the received activation key is correct, enable operational parameters in the gas turbine engine and the engine controller when the received activation key is correct, and control the gas turbine engine using the enabled operational parameters.

In another embodiment, a system for providing end-use specific customization of gas turbine engine operation includes a first processing unit, a second processing unit, a gas turbine engine, and an engine controller. The first processing unit is configured to transmit a request for an activation key and, upon receipt of the requested activation key, to transmit the requested activation key. The second processing unit is disposed remote from, and is in operable communication with, the first processing unit. The second processing unit is configured to receive the request from the first processing unit and is configured, upon receipt of the request, to transmit the requested activation key to the first processing unit. The gas turbine engine is in operable communication with the first processing unit. The gas turbine engine is configured to receive the activation key transmitted by the first processing unit. The engine controller is in operable communication with the first processing unit and the gas turbine engine. The engine controller configured to receive the activation key transmitted by the first processing unit and operable, upon receipt of the activation key, to: verify the received activation key is correct, enable operational parameters in the gas turbine engine and the engine controller when the received activation key is correct, and control the gas turbine engine using the enabled operational parameters.

In yet another embodiment, a method for providing end-use specific customization of gas turbine engine operation includes requesting, from a first processing unit to a second processing unit, one or more activation keys; transmitting, from the second processing unit to the first processing unit, the one or more activation keys the were requested; transmitting the one or more activation keys from the first processing unit to a gas turbine engine and an engine controller; verifying, using control logic in the engine controller, whether the one or more activation keys are correct; enabling selected operational parameters in the gas turbine engine and engine controller when the one or more activation keys are verified; and operating and controlling the gas turbine engine using the enabled operational parameters.

Furthermore, other desirable features and characteristics of the disclosed system and method will become apparent from the subsequent detailed description, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although some specific embodiments may be depicted and described in the context of an end-user being an aircraft owner/operator, it will be appreciated in other embodiments the end-user context may vary.

Figure 1:
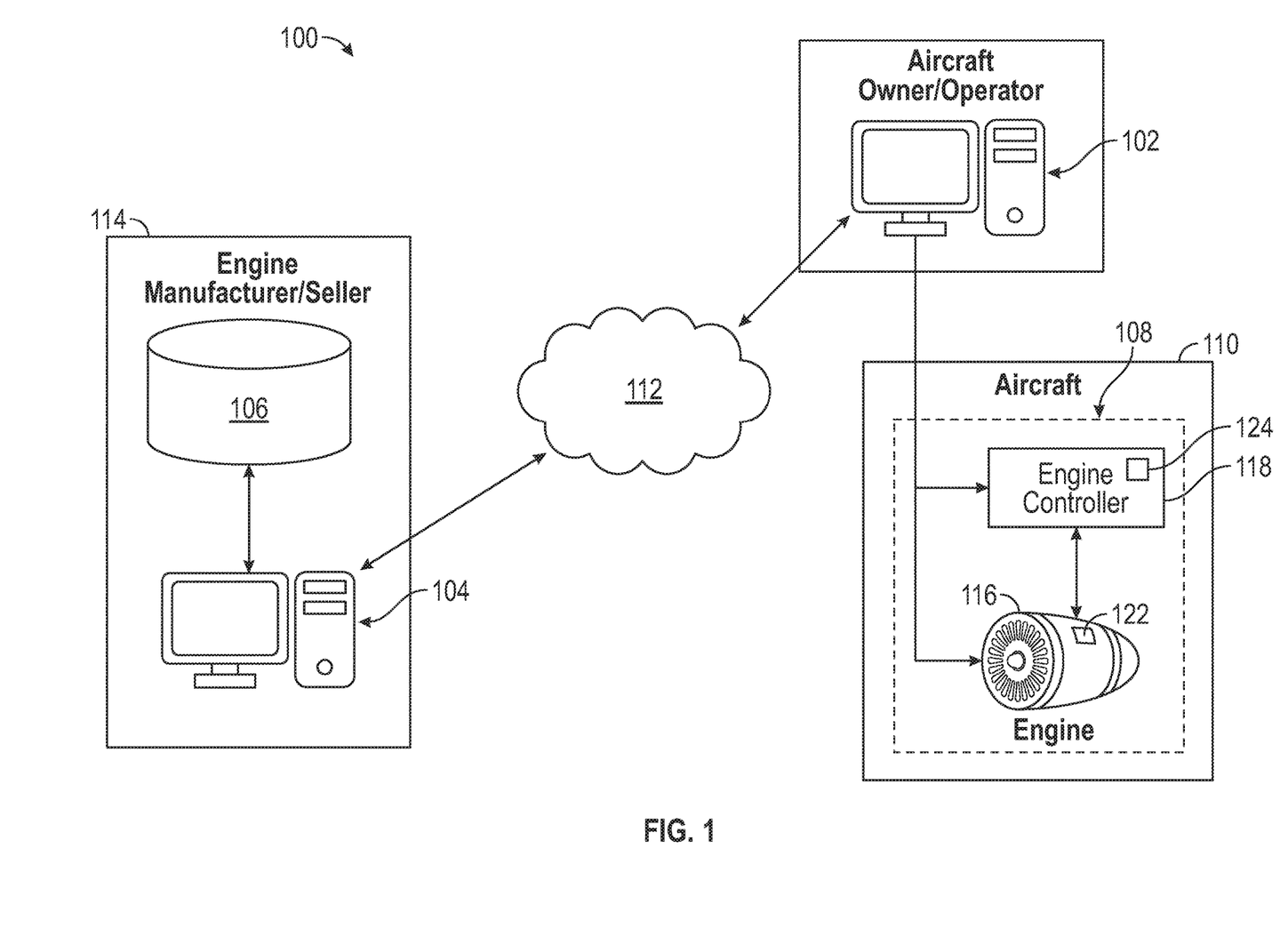
FIG. 1 depicts a functional block diagram of one embodiment of a system for providing aircraft-specific customization of gas turbine engine operation.

Referring to FIG. 1, a functional block diagram of one embodiment of a system 100 that provides end-use specific customization of gas turbine engine operation is depicted. The system 100 includes a first processing unit 102, a second processing unit 104, a memory storage unit 106, and a gas turbine engine system 108. Before proceeding further, it is noted that only one each of the first processing unit 102, second processing unit 104, memory storage unit 106, and gas turbine engine system 108 are depicted in FIG. 1. However, it should be further noted that this is done for clarity and ease of depiction. In other embodiments, the system 100 may be implemented with multiple first processing units 102, multiple second processing units 104, multiple memory storage units 106, and/or multiple gas turbine engine systems 108.

The first processing unit 102 is owned, operated, and/or otherwise controlled by an owner/operator of the gas turbine engine system 108. In the depicted embodiment, the gas turbine engine system 108 is installed in an aircraft 110, and thus the owner/operator is an aircraft owner/operator. In the depicted embodiment, the first processing unit 102 is disposed remote from both the second processing unit 104 and memory storage unit 106, and may selectively communicate with the second processing unit 104 via an interconnected communication network 112, such as the Internet or any one of numerous other suitable communication mediums.

The first processing unit 102 may be implemented using any one of numerous types of processing devices. For example, it may be a desktop terminal, a laptop device, a notebook device, a tablet device, or any one of numerous types of handheld devices. Moreover, the first processing unit 102 may be in operable communication with the interconnected communication network 112 directly, or indirectly via a communication server or other device.

No matter its specific implementation, the first processing unit 102 includes at least one processor and a computer-readable storage device or media encoded with programming instructions for configuring the processor. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processor.

As FIG. 1 also depicts, the first processing unit 102 may be placed in operable communication with the gas turbine engine system 108. Although FIG. 1 depicts this communication occurring separate from the interconnected communication network 112, it will be appreciated that, at least in some embodiments, such communication could indeed be via the interconnected communication network 112. Moreover, the communication between the first processing unit 102 and the gas turbine engine system 108 could be via a wired connection, a wireless connection, or any combination thereof. The first processing unit 102 may thus be disposed remotely from the aircraft 110 or be collocated with the aircraft 110.

The second processing unit 104 is owned, operated, and/or otherwise controlled by a manufacturer/seller of the gas turbine engine system 108. As noted above, the second processing unit 104 is disposed remote from the first processing unit 102 and memory, and may selectively communicate with the first processing unit 102 via the interconnected communication network 112. The second processing unit 104 may be disposed in one or more designated sites 114 established by the manufacturer/seller.

Similar to the first processing unit 102, the second processing unit 104 may also be implemented using any one of numerous types of processing devices. For example, it may be a desktop terminal, a laptop device, a notebook device, a tablet device, or any one of numerous types of handheld devices. Moreover, the second processing unit 104 may be in operable communication with the interconnected communication network 112 directly, or indirectly via a communication server or other device.

No matter its specific implementation, the second processing unit 104 also includes at least one processor and a computer-readable storage device or media encoded with programming instructions for configuring the processor. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processor.

The second processing unit 104 is also in operable communication with the memory storage unit 106. Although, for sake of clarity and ease of illustration, the memory storage unit 106 is depicted as being collocated with the second processing unit 104, it will be appreciated that it may also be disposed remote from the second processing unit 104. In addition, although FIG. 1 depicts the communication occurring separate from the interconnected communication network 112, it will be appreciated that, at least in some embodiments, such communication could indeed be via the interconnected communication network 112. Moreover, the communication between the second processing unit 104 and the memory storage unit 106 could be via a wired connection, a wireless connection, or any combination thereof.

The memory storage unit 106 may be implemented using any one of numerous data storage devices. Some non-limiting examples include any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

No matter its specific implementation, however, the memory storage unit 106 stores at least a plurality of activation keys. As will be described further below, the activation keys enable various operational parameters to allow the gas turbine engine system 108 to be operated in accordance with desired operational goals of the owner/operator. Each activation key is at least unique to each end-use environment, such as each aircraft 110 in an aircraft fleet, and to each type of gas turbine engine system 108. Thus, in the context of an aircraft fleet, an activation key will be unique to the specific tail number of the aircraft 110 and to the specific type of gas turbine engine system 108 installed on the aircraft 110.

The gas turbine engine system 108 includes both a gas turbine engine 116 and an associated engine controller 118. The first processing unit 102 may be placed in operable communication with both the gas turbine engine 116 and the associated engine controller 118. This is because the activation key that is requested by the first processing unit 102 is stored in and verified by both the gas turbine engine 116 and its associated controller 118. As such, and as FIG. 1 further depicts, the gas turbine engine 116 has a memory storage unit 122 disposed therein, and its associated controller 118 also has a memory storage unit 124 disposed therein. These memory storage units 122, 124 each store at least one or more known-to-be-valid activation keys. This, in part, is so that the activation key(s) need not be retransmitted and restored if either the gas turbine engine 116 or engine controller 118 are replaced. In particular, if the engine controller 118 is replaced, the one or more known-to-be-valid activation keys stored in the engine memory storage unit 122 will be automatically transferred to the controller memory storage unit 124. Similarly, if the gas turbine engine 116 is replaced, the one or more known-to-be-valid activation keys stored in the controller memory storage unit 124 will be automatically transferred to the engine memory storage unit 122.

The engine controller 118, as is generally known, is configured to control the operation of the gas turbine engine 116, while maintaining the engine operating parameters within appropriate limits. To do so, the engine controller implements control logic that controls overall gas turbine engine operation over a range of specified operational parameters. The operational parameters, which are stored in the engine controller 118, are unique to each type of gas turbine engine 116, and may be established during manufacture and initial testing of the gas turbine engine 116. Typically, these standard default operational parameters are fixed, and provide significant amounts operational margin. As a result, the gas turbine engine 116 may not operate in a manner that meets the owner/operator's goals.

In the depicted embodiment, the control logic implemented in the engine controller 118 allows the engine controller 118 to vary (either increasing or decreasing) one or more of the standard default operational parameters (to thereby raise or lower the operational margin) to implement multiple modes of operation. As a result, gas turbine engine operation may be optimized to provide specific levels of various energy output while maintaining the gas turbine parameters under the maximum safe limits of operation. These multiple operational modes allow combinations of energy output ranges tailored to specific end-user operational goals. These operational goals may vary, and may include one or more of maximum power, minimum fuel consumption, and maximum time between overhaul, just to name a few. It will additionally be appreciated that the operational parameters may vary. Some non-limiting examples include cool-down cycle time, rotational speed limits, pneumatic output, and energy output, just to name a few.

The one or more activation keys retrieved by the first processing unit 102 and transmitted to the gas turbine engine system 108 will enable the operational parameters associated with the operational goals. In particular, the control logic within the engine controller 118 will verify the activation key that it receives by comparing the received activation key to the known-to-be-valid activation keys stored in the controller memory storage unit 124. Upon verification, the engine controller 118 will enable the operational parameters associated with the one or more activation keys. Because, as noted above, each activation key is also unique to each end-use environment, such as each aircraft 110 in an aircraft fleet, an owner/operator can individually configure each of its end-use systems, such as each aircraft in its fleet.

Having described the overall system 100 and its subsystems and components, the process implemented in the system 100 for providing aircraft-specific customization of gas turbine engine operation will now be described. In so doing, reference should be made to FIG. 2, which depicts one embodiment of the process in flowchart form. It should be noted that the parenthetical references in the following description refer to like-numbered flowchart blocks in FIG. 2.

Figure 2:
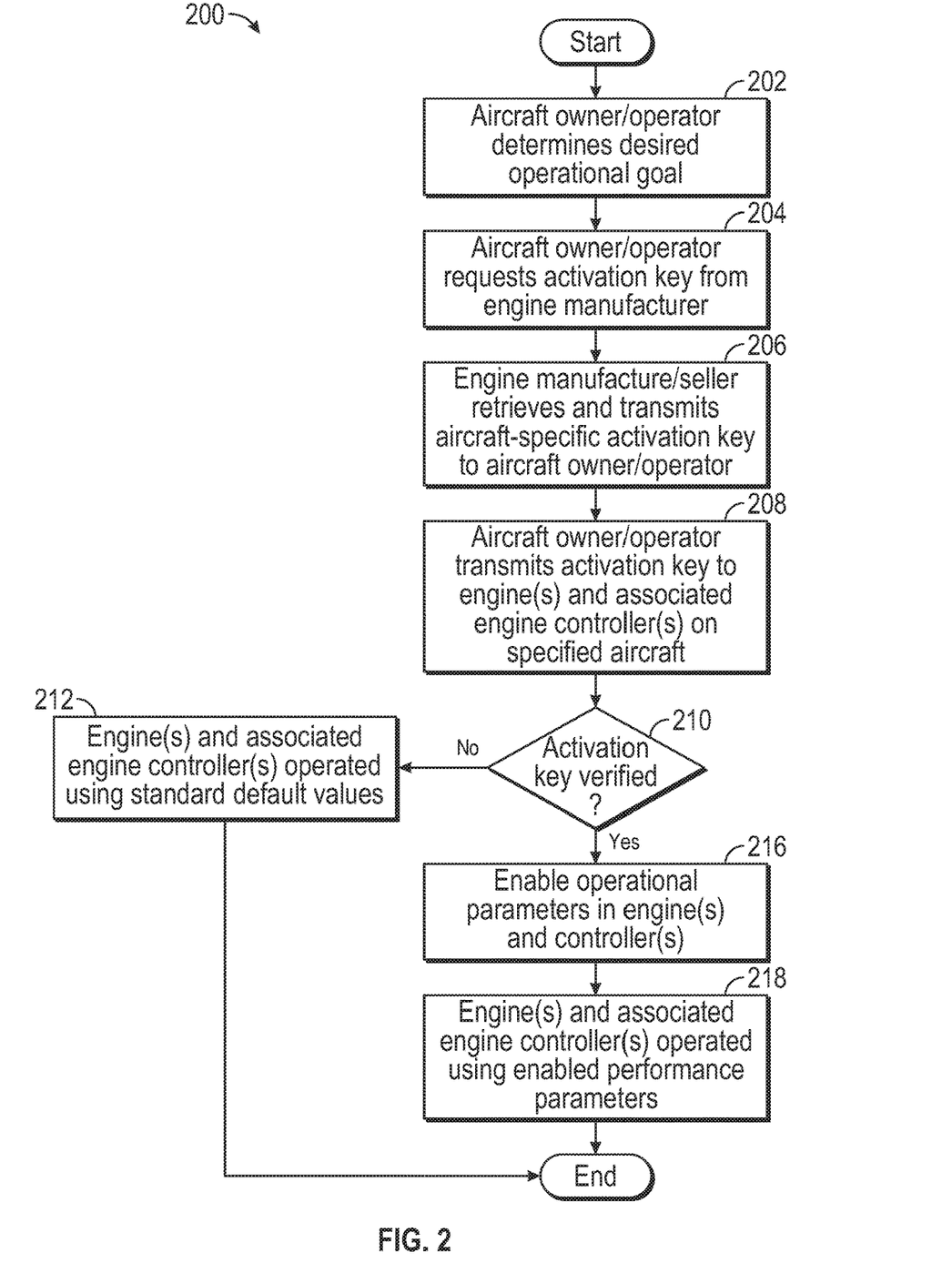
FIG. 2 depicts a process, in flowchart form, implemented in the system of FIG. 1 for providing aircraft-specific customization of gas turbine engine operation.

The process 200 begins when an owner/operator (e.g., an aircraft owner/operator) determines its desired operational goals (202) and then, based on this determination, requests one or more appropriate activation keys from the engine manufacturer/seller (204). As noted above, this request is made from the first processing unit 102 to the second processing unit 104, via the interconnected communication network 112. In response, the engine manufacturer/seller retrieves the activation key(s) from the memory storage unit 106, and transmits the retrieved activation key(s) to the owner/operator (206). Again, this transmission is from the second processing unit 104 to the first processing unit 102, via the interconnected communication network 112.

The owner/operator, upon receipt of the activation key(s), transmits the activation key(s) to the gas turbine engine 116 and engine controller 118 on the specific aircraft (208). The engine controller 108, using the installed control logic, compares the received activation key(s) to the known-to-be-valid activation keys stored in the memory storage unit 124 to verify whether the activation key(s) is (are) correct (210). If it is not, then the engine controller 118 controls the gas turbine engine 116 using the standard default operational parameters (212). If, however, the activation key(s) is (are) verified, the associated operational parameters in the gas turbine engine 116 and engine controller 118 are enabled (214), and the gas turbine engine 116 is operated and controlled using the enabled operational parameters (216).

The system and method described herein provides end-use specific customization of gas turbine engine operation. In particular, the system and method allow existing end-users to customize the functionality of the gas turbine engine based on current needs. Thus, overall gas turbine engine system design may be optimized to meet end-user needs.

In one embodiment, a system for providing end-use specific customization of gas turbine engine operation includes a gas turbine engine, a first processing unit, and an engine controller. The first processing unit is configured to selectively transmit an activation key. The engine controller is in operable communication with the first processing unit and the gas turbine engine. The engine controller is configured to receive the activation key transmitted by the first processing unit and is operable, upon receipt of the activation key, to: verify the received activation key is correct, enable operational parameters in the gas turbine engine and the engine controller when the received activation key is correct, and control the gas turbine engine using the enabled operational parameters.

These aspects and other embodiments may include one or more of the following features. The system of may include a controller memory storage unit disposed within the engine controller that has at least one activation key stored therein. The system may include an engine memory storage unit disposed within the gas turbine engine that has at least one activation key stored therein. The first processing unit may be further configured to transmit a request for the activation key and, upon receipt of the requested activation key, to transmit the requested activation key to the engine controller. The first processing unit may be further configured to transmit the requested activation key to the gas turbine engine. The system may include a second processing unit disposed remote from, and in operable communication with, the first processing unit. The second processing unit may be configured to receive the request from the first processing unit and be configured, upon receipt of the request, to transmit the requested activation key to the first processing unit. The system may include a memory storage unit in operable communication with the second processing unit. The memory storage unit may have a plurality of activation keys stored therein. The second processing unit may be further configured, upon receipt of the request from the first processing unit, to retrieve the requested activation key from the memory storage device. The first processing unit and the second processing unit may be in operable communication via an interconnected communication network.

In another embodiment, a system for providing end-use specific customization of gas turbine engine operation includes a first processing unit, a second processing unit, a gas turbine engine, and an engine controller. The first processing unit is configured to transmit a request for an activation key and, upon receipt of the requested activation key, to transmit the requested activation key. The second processing unit is disposed remote from, and is in operable communication with, the first processing unit. The second processing unit is configured to receive the request from the first processing unit and is configured, upon receipt of the request, to transmit the requested activation key to the first processing unit. The gas turbine engine is in operable communication with the first processing unit. The gas turbine engine is configured to receive the activation key transmitted by the first processing unit. The engine controller is in operable communication with the first processing unit and the gas turbine engine. The engine controller is configured to receive the activation key transmitted by the first processing unit and operable, upon receipt of the activation key, to: verify the received activation key is correct, enable operational parameters in the gas turbine engine and the engine controller when the received activation key is correct, and control the gas turbine engine using the enabled operational parameters.

These aspects and other embodiments may include one or more of the following features. The system may include a memory storage unit in operable communication with the second processing unit that has a plurality of activation keys stored therein. The second processing unit may be further configured, upon receipt of the request from the first processing unit, to retrieve the requested activation key from the memory storage device. The system may include a controller memory storage unit disposed within the engine controller and having at least one activation key stored therein. The system may include an engine memory storage unit disposed within the gas turbine engine that has at least one activation key stored therein. The first processing unit and the second processing unit may be in operable communication via an interconnected communication network.

In yet another embodiment, a method for providing end-use specific customization of gas turbine engine operation includes requesting, from a first processing unit to a second processing unit, one or more activation keys; transmitting, from the second processing unit to the first processing unit, the one or more activation keys the were requested; transmitting the one or more activation keys from the first processing unit to a gas turbine engine and an engine controller; verifying, using control logic in the engine controller, whether the one or more activation keys are correct; enabling selected operational parameters in the gas turbine engine and engine controller when the one or more activation keys are verified; and operating and controlling the gas turbine engine using the enabled operational parameters. These aspects and other embodiments may include one or more of the following features. The second processing unit may be used to retrieve the one or more activation keys from a memory storage unit. The gas turbine engine may be operated and controlled using standard default operational parameters when the one or more activation keys are not verified. The first processing unit and the second processing unit may be in operable communication via an interconnected communication network.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:

1. A system for providing end-use specific customization of gas turbine engine operation, the system comprising:
    a gas turbine engine;
    a first processing unit configured to transmit an activation key, the activation key having one or more operational parameters associated therewith; and
    an engine controller in operable communication with the first processing unit and the gas turbine engine, the engine controller configured to receive the activation key transmitted by the first processing unit and operable, upon receipt of the activation key, to:
        verify the received activation key is correct by comparing the received activation key to one or more known-to-be-valid activation keys,
        control the gas turbine engine using standard default operational parameters when the received activation key is not correct,
        enable the one or more operational parameters associated with the activation key in the gas turbine engine and the engine controller when the received activation key is correct, and
        control the gas turbine engine using the enabled operational parameters.

2. The system of claim 1, further comprising:
    a controller memory storage unit disposed within the engine controller, the controller memory storage unit having at least one known-to-be-valid activation key stored therein.

3. The system of claim 1, further comprising:
    an engine memory storage unit disposed within the gas turbine engine, the engine memory storage unit having at least one known-to-be-valid activation key stored therein.

4. The system of claim 1, wherein the first processing unit is further configured to transmit a request for the activation key and, upon receipt of the requested activation key, to transmit the requested activation key to the engine controller.

5. The system of claim 4, wherein the first processing unit is further configured to transmit the requested activation key to the gas turbine engine.

6. The system of claim 4, further comprising:
    a second processing unit disposed remote from, and in operable communication with, the first processing unit, the second processing unit configured to receive the request from the first processing unit and configured, upon receipt of the request, to transmit the requested activation key to the first processing unit.

7. The system of claim 6, further comprising:
    a memory storage unit in operable communication with the second processing unit, the memory storage unit having a plurality of activation keys stored therein.

8. The system of claim 7, wherein the second processing unit is further configured, upon receipt of the request from the first processing unit, to retrieve the requested activation key from the memory storage device.

9. The system of claim 6, wherein the first processing unit and the second processing unit are in operable communication via an interconnected communication network.

10. A system for providing end-use specific customization of gas turbine engine operation, the system comprising:
    a first processing unit configured to transmit a request for an activation key and, upon receipt of the requested activation key, to transmit the requested activation key, the requested activation key having one or more operational parameters associated therewith;
    a second processing unit disposed remote from, and in operable communication with, the first processing unit, the second processing unit configured to receive the request from the first processing unit and configured, upon receipt of the request, to transmit the requested activation key to the first processing unit;
    a gas turbine engine in operable communication with the first processing unit, the gas turbine engine configured to receive the activation key transmitted by the first processing unit; and
    an engine controller in operable communication with the first processing unit and the gas turbine engine, the engine controller configured to receive the activation key transmitted by the first processing unit and operable, upon receipt of the activation key, to:
        verify the received activation key is correct by comparing the received activation key to one or more known-to-be-valid activation keys,
        control the gas turbine engine using standard default operational parameters when the received activation key is not correct,
        enable the one or more operational parameters associated with the activation key in the gas turbine engine and the engine controller when the received activation key is correct, and
        control the gas turbine engine using the enabled operational parameters.

11. The system of claim 10, further comprising:
    a memory storage unit in operable communication with the second processing unit, the memory storage unit having a plurality of activation keys stored therein.

12. The system of claim 11, wherein the second processing unit is further configured, upon receipt of the request from the first processing unit, to retrieve the requested activation key from the memory storage device.

13. The system of claim 10, further comprising:
a controller memory storage unit disposed within the engine controller, the controller memory storage unit having at least one known-to-be-valid activation key stored therein.

14. The system of claim 10, further comprising:
an engine memory storage unit disposed within the gas turbine engine, the engine memory storage unit having at least one known-to-be-valid activation key stored therein.

15. The system of claim 10, wherein the first processing unit and the second processing unit are in operable communication via an interconnected communication network.

16. A method for providing end-use specific customization of gas turbine engine operation, the method comprising the steps of:
requesting, from a first processing unit to a second processing unit, one or more activation keys;
transmitting, from the second processing unit to the first processing unit, the one or more activation keys the were requested;
transmitting the one or more activation keys from the first processing unit to a gas turbine engine and an engine controller;
verifying, using control logic in the engine controller, whether the one or more activation keys are correct by comparing the one or more activation keys to one or more known-to-be-valid activation keys;
operating and controlling the gas turbine engine using standard default operational parameters when the one or more activation keys are not verified;
enabling operational parameters associated with the one or more activation keys in the gas turbine engine and engine controller when the one or more activation keys are verified; and
operating and controlling the gas turbine engine using the enabled operational parameters.

17. The method of claim 16, further comprising:
retrieving, using the second processing unit, the one or more activation keys from a memory storage unit.

18. The method of claim 16, wherein the first processing unit and the second processing unit are in operable communication via an interconnected communication network.

* * * * *